US011129489B2

(12) United States Patent
Hua et al.

(10) Patent No.: US 11,129,489 B2
(45) Date of Patent: *Sep. 28, 2021

(54) APPARATUS AND METHOD FOR CONTROLLING THE TASTE OF COFFEE, AND A COFFEE MAKER COMPRISING THE APPARATUS

(71) Applicant: KONINKLIJKE PHILIPS N.V., Eindhoven (NL)

(72) Inventors: Qiao Hua, Eindhoven (NL); Declan Patrick Kelly, Eindhoven (NL); Guangwei Wang, Eindhoven (NL); Jingwei Tan, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/725,341

(22) Filed: Dec. 23, 2019

(65) Prior Publication Data

US 2020/0129000 A1    Apr. 30, 2020

Related U.S. Application Data

(62) Division of application No. 15/103,332, filed as application No. PCT/EP2014/007949 on Dec. 31, 2014, now Pat. No. 10,512,356.

(30) Foreign Application Priority Data

Mar. 21, 2014    (EP) .................................... 14161182

(51) Int. Cl.
*A47J 31/00*    (2006.01)
*C02F 1/42*    (2006.01)
(Continued)

(52) U.S. Cl.
CPC ............... *A47J 31/002* (2013.01); *A23F 5/26* (2013.01); *A23L 2/56* (2013.01); *C02F 1/42* (2013.01); *C02F 1/66* (2013.01); *C02F 5/08* (2013.01)

(58) Field of Classification Search
CPC .......... A47J 31/002; A47J 31/02; A47J 31/06; A23F 5/20; A23F 5/202; A23F 5/22;
(Continued)

(56) References Cited

U.S. PATENT DOCUMENTS 2,155,971 A    4/1939  Houseman
3,108,876 A    10/1963 Turken et al.
(Continued)

FOREIGN PATENT DOCUMENTS

CH    706485 A2    11/2013
CN    1035481 A    9/1989
(Continued)

*Primary Examiner* — Joseph W Drodge
(74) *Attorney, Agent, or Firm* — Schott, P.C.

(57) ABSTRACT

An apparatus for controlling the taste of coffee, a method of controlling the taste of coffee and a coffee maker including the apparatus. The apparatus includes a control unit, configured to determine a target pH value of water corresponding to a desired coffee taste, and a corresponding adjustment control signal; and a pH adjustment unit, configured to adjust, in response to the adjustment control signal applied to the pH adjustment unit, the pH value of water to be fed into a brewing unit of a coffee maker to the target pH value. In accordance with embodiments of the present disclosure, the pH value of water to be fed to a brewing unit of a coffee maker may be adjusted for a desired coffee taste.

20 Claims, 9 Drawing Sheets

(51) Int. Cl.
*C02F 1/66* (2006.01)
*A23L 2/56* (2006.01)
*C02F 5/08* (2006.01)
*A23F 5/26* (2006.01)

(58) Field of Classification Search
CPC .... A23F 5/223; A23F 5/24; A23F 5/26; A23F 5/46; A23F 5/465; A23F 5/48; C02F 1/42; C02F 1/46; C02F 1/4609; C02F 1/461; C02F 1/4618; C02F 1/66; C02F 5/00; C02F 5/08; C02F 2001/422; C02F 2001/425; C02F 2001/427; C02F 2001/46185; C02F 2001/4619; C02F 2209/00; C02F 2209/005; C02F 2209/006; C02F 2209/06; A23L 2/56
USPC ....... 210/660, 662, 683, 685, 696, 739, 743; 426/68, 77, 78, 430–434, 534, 594–596; 99/279, 280, 283, 285, 298, 299
See application file for complete search history.

(56) References Cited

U.S. PATENT DOCUMENTS

| | | | |
|---|---|---|---|
| 3,973,986 | A | 8/1976 | Schoenrock et al. |
| 4,217,217 | A * | 8/1980 | Kay .......................... C02F 1/66 210/220 |
| 4,855,043 | A | 8/1989 | Dalton |
| 5,900,141 | A | 5/1999 | Takigawa et al. |
| 6,056,989 | A | 5/2000 | Sasagawa et al. |
| 10,512,356 | B2 * | 12/2019 | Hua ........................... A23L 2/56 |
| 2001/0009758 | A1 * | 7/2001 | Harris .................... C10G 45/08 435/4 |
| 2003/0180431 | A1 | 9/2003 | Young et al. |
| 2003/0185940 | A1 * | 10/2003 | Watanuki ................ A23F 5/267 426/66 |
| 2004/0009585 | A1 * | 1/2004 | Venancio ............. G01N 27/126 435/287.2 |
| 2005/0214433 | A1 | 9/2005 | Hardesty et al. |
| 2005/0263457 | A1 | 12/2005 | Wilkins et al. |
| 2006/0272993 | A1 | 12/2006 | Bagley |
| 2008/0131562 | A1 | 6/2008 | Korber et al. |
| 2008/0163896 | A1 | 7/2008 | Ioannone |
| 2008/0175963 | A1 * | 7/2008 | Pope ...................... A47J 31/44 426/231 |
| 2009/0199866 | A1 | 8/2009 | Kirkpatrick |
| 2011/0038998 | A1 | 2/2011 | Kohli |
| 2012/0070544 | A1 | 3/2012 | Van der Veen et al. |
| 2012/0125204 | A1 | 5/2012 | Del Sante |
| 2013/0071532 | A1 | 3/2013 | Pribus et al. |
| 2013/0280387 | A1 | 10/2013 | Tan et al. |
| 2013/0299424 | A1 * | 11/2013 | McLeod ................... C02F 9/00 210/638 |
| 2015/0083667 | A1 | 3/2015 | Stouffer |
| 2015/0203378 | A1 * | 7/2015 | Steffen ................ C02F 1/46104 99/284 |
| 2018/0000108 | A1 | 1/2018 | Boggavarapu |

FOREIGN PATENT DOCUMENTS

| | | |
|---|---|---|
| CN | 1731948 A | 2/2006 |
| CN | 101111179 A | 1/2008 |
| CN | 101137786 A | 3/2008 |
| CN | 101146455 A | 3/2008 |
| CN | 102481069 A | 5/2012 |
| CN | 103070244 A | 5/2013 |
| EP | 1911382 A1 | 4/2008 |
| JP | S6475895 A | 3/1989 |
| JP | H11276351 A | 10/1999 |
| JP | 2001078670 A | 3/2001 |
| JP | 2006167301 A | 6/2006 |
| JP | 2006198555 A | 8/2006 |
| JP | 2012525510 A | 10/2012 |
| JP | 2013085645 A | 5/2013 |
| WO | 2009057759 A1 | 5/2009 |
| WO | 2013098777 A1 | 7/2013 |
| WO | 2013154664 A1 | 10/2013 |
| WO | 2014002005 A2 | 1/2014 |

* cited by examiner

APPARATUS AND METHOD FOR CONTROLLING THE TASTE OF COFFEE, AND A COFFEE MAKER COMPRISING THE APPARATUS

CROSS-REFERENCE TO RELATED APPLICATIONS

This application is a divisional application of co-pending prior U.S. patent application Ser. No. 15/103,332, filed Jun. 10, 2016, which is a national application of PCT Application No. PCT/EP2014/079490, filed Dec. 31, 2014, the entire contents of which are incorporated herein by reference thereto.

FIELD OF THE INVENTION

Embodiments of the present disclosure generally relate to coffee making, and more particularly to an apparatus for controlling the taste of coffee, a method of controlling the taste of coffee, and a coffee maker comprising said apparatus.

BACKGROUND OF THE INVENTION

Currently, coffee manufacturers are making great efforts to optimize brewing systems and offer coffee beans or grinds which are diverse in taste, so as to enable fast and convenient coffee making providing coffee of various tastes. Moreover, many coffee makers have been tested for their coffee tastes and have been certified by authorities. Therefore, the coffee making machines may comprise a logo saying for example "Certified by Italian Tasters". However, these taste tests are performed under controlled parameters and in practice it is difficult for consumers to obtain the desired coffee taste because coffee makers might be used in various environments with various parameters. This means that a coffee maker might produce coffee with different tastes even if it is used with the same coffee beans.

For example, as one of most important ingredients of coffee, water usually has very different properties in different locations through the world. Moreover, even if it is suggested to brew coffee with pure water or bottled water, many coffee drinkers still trust the quality of tap water and use it to brew coffee. These differences might result in coffee having different tastes.

In addition, although the coffee makers could brew coffee whose taste is recommended or considered as the best by experts, consumers always have their own coffee drinking habits. As a matter of fact, different people usually have different coffee taste preferences. For example, some people would prefer stronger coffee while others prefer milder coffee; some people like stronger coffee in the morning and milder coffee in the afternoon while other people have other preferences. Thus, the same coffee, even if it is highly recommended by experts, cannot satisfy all coffee drinkers.

SUMMARY OF THE INVENTION

To this end, in the present disclosure, there is provided a solution enabling controlling the taste of coffee so as to obviate or at least partially mitigate at least part of the above problems.

In a first aspect of the present disclosure, there is provided an apparatus for controlling the taste of coffee. The apparatus comprises a control unit and a pH adjustment unit. The control unit is configured to determine a target pH value of water corresponding to a desired taste of coffee and a corresponding adjustment control signal. The pH adjustment unit is configured to adjust, in response to the adjustment control signal applied to the pH adjustment unit, the pH value of water to be fed into a brewing unit of a coffee maker to the target pH value.

In a second aspect of the present disclosure, there is provided a method of controlling the taste of coffee. The method comprises determining a target pH value of water corresponding to a desired taste of coffee and a corresponding adjustment control signal; and adjusting, in response to the adjustment control signal, the pH value of water to be fed into a brewing unit of a coffee maker to the target pH value.

In a third aspect of the present disclosure, there is further provided a coffee maker comprising an apparatus for controlling the coffee taste according to the first aspect of the present disclosure.

In accordance with embodiments of the present disclosure, the pH value of water to be fed to a brewing unit of a coffee maker may be adjusted to achieve a desired coffee taste. In such a manner, the influence of water properties on the taste of coffee may be greatly decreased, and thus it is possible to make coffee with the same desired taste even when water with different properties is used.

Other features and advantages of embodiments of the present disclosure will also be apparent from the following description of specific embodiments when read in conjunction with the accompanying drawings, which illustrate, by way of example, the principles of embodiments of the present disclosure.

BRIEF DESCRIPTION OF THE DRAWINGS

Embodiments of the disclosure are presented in the sense of examples and their advantages are explained in greater detail below, with reference to the accompanying drawings throughout which like reference numbers represent same or similar components and wherein.

DETAILED DESCRIPTION OF EMBODIMENTS

Hereinafter, embodiments of the present disclosure will be described in detail with reference to the accompanying drawings. It should be appreciated that, although the specification contains many specific implementation details, these details are not to be construed as limitations on the scope of any(?) invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described hereinabove as acting in certain combinations and may even initially be claimed as such, one or more features of a claimed combination can in some cases be excised from the combination, and the claimed combination may be directed to a sub-combination or variation of a sub-combination.

Generally, all terms used in the claims are to be interpreted according to their ordinary meaning in the technical field, unless explicitly defined otherwise herein. All references to "a/an/the/said [element, device, component, means, step, etc]" are to be interpreted openly as referring to at least one instance of said element, device, component, means, unit, step, etc., without excluding a plurality of such devices, components, means, units, steps, etc., unless explicitly stated otherwise.

Hereinafter, reference will be made to FIGS. 1 to 14 to first describe an apparatus for controlling coffee taste and a coffee maker comprising the apparatus according to an embodiment of the present disclosure.

Figure 1:
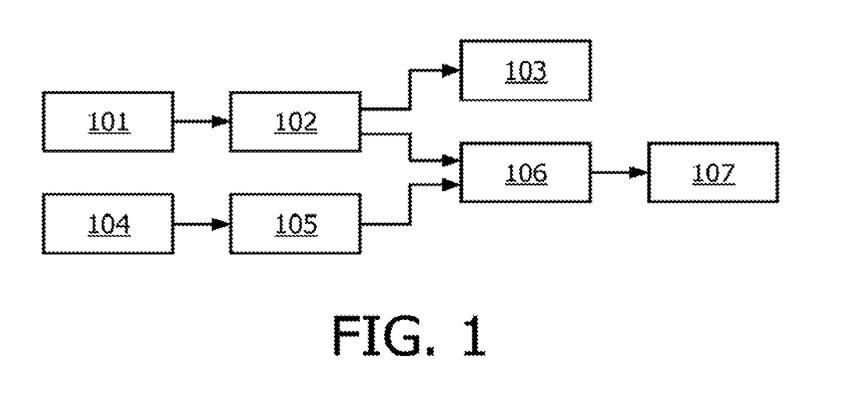
FIG. 1 illustrates a schematic diagram of controlling the taste of coffee according to an embodiment of the present disclosure.

Reference is first made to FIG. 1, which illustrates a schematic diagram of controlling the taste of coffee according to an embodiment of the present disclosure. As illustrated, in a coffee maker, there is a newly added apparatus 102 for controlling the taste of coffee, which can treat water 101 to be used in a brewing unit 106, particularly by adjusting the pH value of the water, so that the water is suitable to achieve a desired coffee taste. The treated water is then fed to a brewing unit 106. On the other hand, coffee beans 104 are also fed to the brewing unit 106 after being ground in grinding unit 105. In the brewing unit 106, coffee is made in a brewing process using treated water and ground coffee beans. After the brewing process is completed, a coffee beverage 107 is obtained which is ready for drinking.

Additionally, the apparatus 102 may also be used for another purpose, for example descaling, as denoted by 103. It may be appreciated that controlling the taste of coffee is carried out by treating water through pH adjustment thereof, which may also be used for descaling. Therefore, in an embodiment of the present disclosure, the apparatus 102 may also be used to treat water so as to descale the coffee maker in rinsing cycles.

As mentioned hereinabove, water has very different properties in different locations all over the world, which might substantially influence the taste of coffee. For example, in Europe, pH values of water vary from less than 4.5 to more than 8.5. However, in existing coffee machines hardly any measures are taken to control the water so that it is suitable for brewing. For one thing, the choice of the water used is left to the end user, and for another thing, coffee maker manufacturers have limited influence on the choice of water. In some of the existing coffee machines, only for the purpose of descaling, there are provided Brita filters to remove contaminants from the water and soften the water, thereby reducing scaling. Thus, in fact, the existing coffee makers do not take into account at all the impact of water on the taste of coffee. Precisely in view of this, in embodiments of the present disclosure, there is proposed a solution for controlling the taste of coffee by adjusting the pH value of water to be fed to a brewing unit of a coffee making machine.

Figure 2:
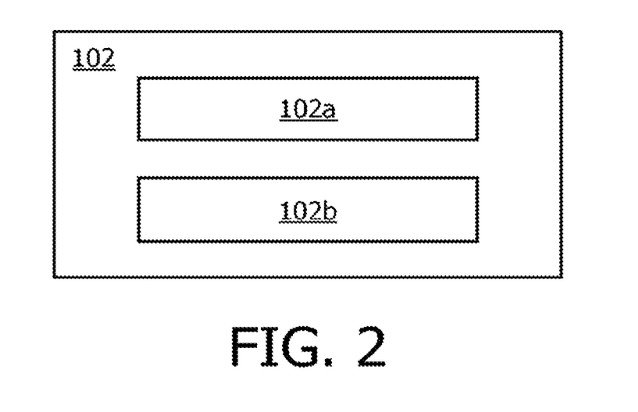
FIG. 2 illustrates a block diagram of an exemplary apparatus for controlling the taste of coffee according to an embodiment of the present disclosure.

Next, reference will be made to FIG. 2 to describe an exemplary apparatus for controlling the taste of coffee according to an embodiment of the present disclosure. As illustrated in FIG. 2, the apparatus 102 includes a control unit 102a and a pH adjustment unit 102b. The control unit 102a is configured to determine a target pH value of water corresponding to a desired coffee taste and a corresponding adjustment control signal. The control unit 102a may be in the form of an embedded microprocessor or any other appropriate processor or controller that is suitable to be used in a coffee maker. Then, the determined adjustment control signal will be provided to the pH adjustment unit 102b, which is configured to adjust, in response to the adjustment control signal applied thereto, the pH value of water to be fed into a brewing unit of a coffee maker to the target pH value.

Figure 3:
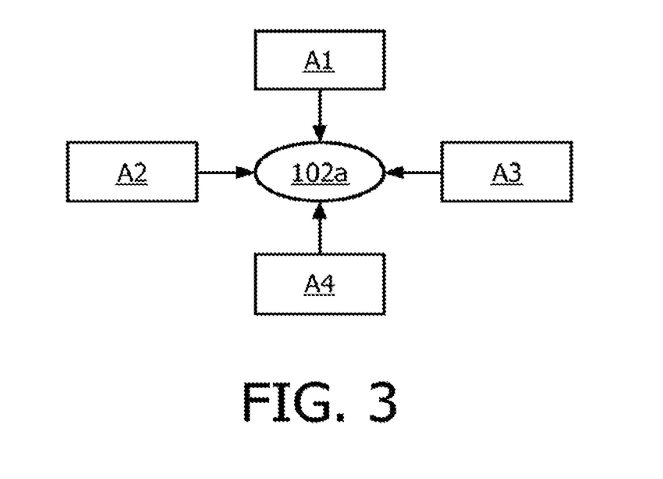
FIG. 3 illustrates a schematic diagram of exemplary example factors that can be used in pH target value determination according to an embodiment of the present disclosure.

In practice, the control unit 102a may determine the target pH value of water corresponding to a desired coffee taste, based on many relevant factors. Hereinafter, only for the purpose of illustration, FIG. 3 illustrates a schematic diagram of several exemplary factors that could be used in pH value determination according to an embodiment of the present disclosure. However, it should be appreciated that the present disclosure is not limited to these factors as given in FIG. 3, and the person skilled in the art might conceive other factors that could also be used in pH value determination from the teachings provided therein.

As illustrated in FIG. 3, the control unit 102a may determine the target pH value of water based on, for example, professional taste evaluation A1. That is to say, for taste control, it may define a reference PH for a reference taste of coffee. The reference taste of coffee may be a recommend taste or an optimal taste which is determined by experts through professional taste evaluation. Through professional taste evaluation, there may also be provided a relationship between pH values and the tastes of coffee. The relationship may be generated based on information provided by experts performing the professional taste evaluation and stored by manufacturers in the memory of the coffee maker. The relationship may be a reference pH value or a reference pH value range corresponding to different tastes of coffee. For example, the experts could recommend reference pH values or ranges respectively for different kinds of coffee.

Figure 4A:
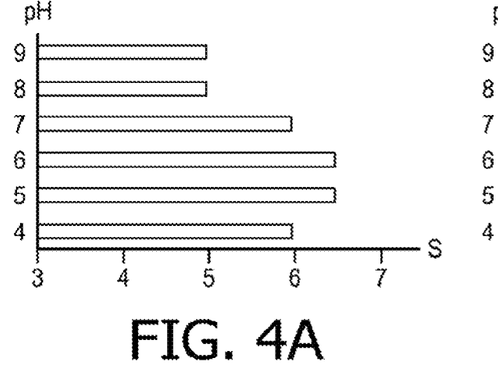
FIGS. 4A to 4D illustrate an example relationship between pH values and the tastes of coffee according to an embodiment of the present disclosure.
Figure 4B:
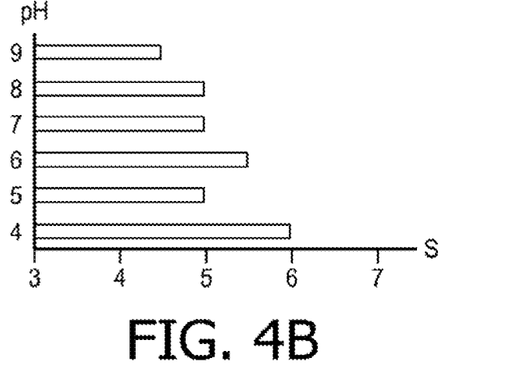
Figure 4C:
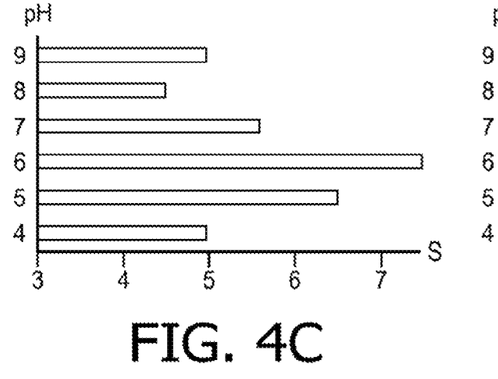
Figure 4D:
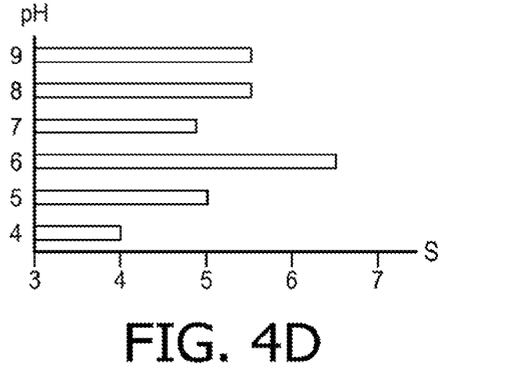

FIGS. 4A to 4D illustrate an example relationship between pH values and tastes of coffee according to an embodiment of the present disclosure, which is obtained through professional taste evaluation. Specifically, FIG. 4A illustrates the relationship between the pH values and scores (S) for sweetness; FIG. 4B illustrates the relationship between the pH values and scores (S) for aftertaste; FIG. 4C illustrates the relationship between the pH values and scores (S) for acidity; and FIG. 4D illustrates the relationship between the pH values and scores (S) for aroma. As illustrated in FIGS. 4A to 4D, for different coffee taste properties, the optimal pH values are different. Based on the above relationships for a reference taste, it is possible to determine the target pH value of water corresponding to a certain taste of coffee. In such a manner, the pH value can be controlled so as to obtain the target value in order to deliver the recommended taste that is considered to be ideal by experts. Hence, the present disclosure enables a consistent taste for a certain kind of coffee to be obtained.

Besides, the target pH value may also be determined based on customer personal preference A2 regarding coffee taste properties or water properties. For example, in the coffee maker, there may be provided some options which can be activated by means of a user interface, so that the customer can input his/her own preference. The user interface could include, for example, a touch display device, a LCD device in combination with buttons, which is used to display coffee taste properties or water properties and provide an interactive interface to the customer. The use of an LCD may provide the customer with a visual display. Or, alternatively, the coffee maker may be provided with a more abstract representation as the user interface, e.g. numerical scales, wheels with colors for representing different coffee taste properties, etc. Such an abstract representation will allow the consumer to make a consistent choice. Thus, it may be appreciated that the selecting of coffee taste properties or water properties may be performed either in a discrete way or in a continuous way.

The coffee taste properties presented by a user interface may include, for example, bitterness, sweetness, acidity, aroma and so on. Therefore, through the user interface, the customer may select coffee taste properties based on his/her own preference. Different coffee taste properties correspond to different target values and thus the customer's selection will result in a change of the water properties. Based on the customer's choice, the control unit 102 may map the target pH value corresponding to the coffee taste selected by the customer. For example, it may use information from professional taste evaluation A2, which gives the relationship between pH values and coffee taste or coffee taste properties, to link the customer's selection to the target pH values.

Besides, the user interface may also directly present options regarding water properties, such as pH value of the water. The user interface could allow consumers to make a choice in a number of ways, such as explicitly choosing the pH of the water, choosing the pH based on example cities (e.g. in European countries, Asian countries). In this case, the range of possible pH values may be mapped to the user interface input so that the customer can make a choice according to his/her taste preference. In such a way, for example, the control unit 102a may receive the customer's selection from the interface and directly map the selection to a corresponding pH value, which will be taken as the target pH value.

Furthermore, other information such as coffee drinking habits, personal physical condition may also be considered. This information may also help to determine or modify suitable coffee taste properties for the customer automatically and then map them to a corresponding pH value or range. These relationships may be provided by manufacturers.

It may be appreciated that, in practice, the consumer's preference may deviate from the expert reference and vary greatly according to regional and personal preference. However, with embodiments of the present disclosure, consumers may be enabled to control the taste of coffee according to their personal respective taste preference rather than making a choice from coffee tastes recommended by experts. In such a way, a personalized taste control may be achieved.

Additionally, the apparatus 102 may also comprise a sensor configured to sense properties A3 of coffee beans or grinds. And, in turn, the control unit 102a may be configured to determine the target pH value of water based on the sensed properties A3 of coffee beans or grinds. It may be appreciated that for different kinds of coffee, particularly different properties A3 of coffee beans or grinds, such as bean type, bean origin, roasting degree and so on, the suitable pH value of water may be different. Based on the sensing results from the sensor, the control unit may determine a suitable pH value as the target value. In practice, the actual pH value that is suitable for brewing with respect to certain properties of beans may be defined by the manufacturers. It should be appreciated that the factor A3 may be used separately or in combination with one or more other factors, such as professional taste evaluation A1, customer personal preference A2 and so on.

Additionally, frequent brewing with for example tap water will cause a scaling problem within the coffee maker. Normally, descaling is achieved by adding a special solution, such as water softeners like vinegar, to the water to create acid water. Current coffee makers usually require the customer to measure the properties of the local water before using the coffee maker and then program the device accordingly through a user interface. Then, based on the number of cups brewed, the device indicates to the customer that it needs to be descaled. Although water softeners have the advantage that they can easily solve the scaling problem, their use involves another issue that cannot be ignored, i.e., the coffee taste deterioration. Water softeners usually consist of a bed of ion exchange resins that trap calcium ions and replace them with sodium ions. However, the extra sodium ions change the properties of the original water, which might adversely influence the taste of coffee.

Figure 5:
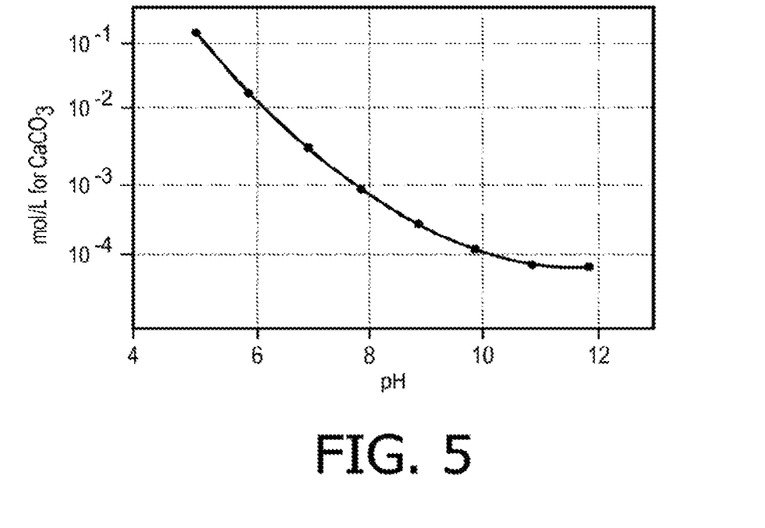
FIG. 5 illustrates a diagram of solubility of $CaCO_3$ in water with different pH values.

To tackle the scaling issue, the control unit 102a may also determine a descaling target pH value of water based on at least one of the hardness setting of the water and the treatment efficiency A4, so as to descale the coffee maker in a rinsing cycle. That is to say, the control unit 102a may also control the pH adjustment unit for descaling. Based on the hardness setting of the water and the treatment efficiency, the control unit 102a may determine the descaling target pH value. For example, the amount of coffee that has been served, for example the number of cups, may be recorded. Thus, when the predetermined amount of coffee is reached, descaling may be performed by treating the water to a target descaling pH value during a rinsing cycle. In such a way, the buildup of scale in the coffee maker can be prevented. FIG.

5 shows a diagram of the solubility of CaCO3 (mol/L) in water with different pH values. From the plot it can be seen that water with a lower pH may solubilize more $CaCO_3$, i.e. the acid water is helpful for descaling. Thus, it is feasible to descale the coffee maker in a rinsing cycle by adjusting the pH value of the water. When the rinsing cycle is completed, the treated water will be discharged as waste water.

On the other hand, it is also possible to descale in a continuous way. That is to say, descaling may be performed each time coffee is made. For example, it is possible to first adjust the pH value of water to a target descaling pH value to descale the coffee maker, before adjusting the pH value to the target pH value corresponding to the desired taste. In such a way, the scale formed may be removed before coffee is brewed. The treated water will be discharged as waste water. In addition, it is also feasible to descale the coffee maker after coffee is brewed. Moreover, it may be appreciated that periodical descaling requires a lower pH (more acidic) solution than continuous descaling, since a certain amount of scale deposit has already accumulated before a rinsing cycle.

After the pH target value is determined, the control unit 102a may determine the corresponding adjustment signal to be applied to the pH adjustment unit. The pH adjustment signal may be determined based on the target pH value and the initial pH of the water. The initial pH value may be obtained through a sensor for detecting the incoming water or it may be provided by the customer who manually measures the pH value of the water. The pH adjustment signal may be, for example, the voltage to be applied to the pH adjustment unit 102b. In such a case, based on the target pH value and the initial pH of the water, the pH adjustment signal may be mapped onto a voltage polarity and amplitude as the pH adjustment signal for a certain flow rate of water. Besides, pH adjustment is also possible by applying current to the pH adjustment unit 102b. Alternatively or additionally, the pH adjustment signal may be also a signal for controlling the flow velocity in the pH adjustment unit 120b. The determination of the pH adjustment signal will be detailed hereinbelow with reference to FIGS. 6 to 9B.

Hereinafter, an exemplary arrangement of the apparatus 102 in a coffee maker will be described with reference to FIG. 6, which shows a diagram of an exemplary schematic architecture of a coffee maker which comprises a pH adjustment unit 102b according to an embodiment of the present disclosure. As to the control unit 102a, it may be appreciated that it may be a controller which is separate from a processor which is already present in a coffee maker or which is not already present in a coffee maker. That is to say, to implement the present invention, a new processor may be added or the original processor may be reused.

Figure 6:
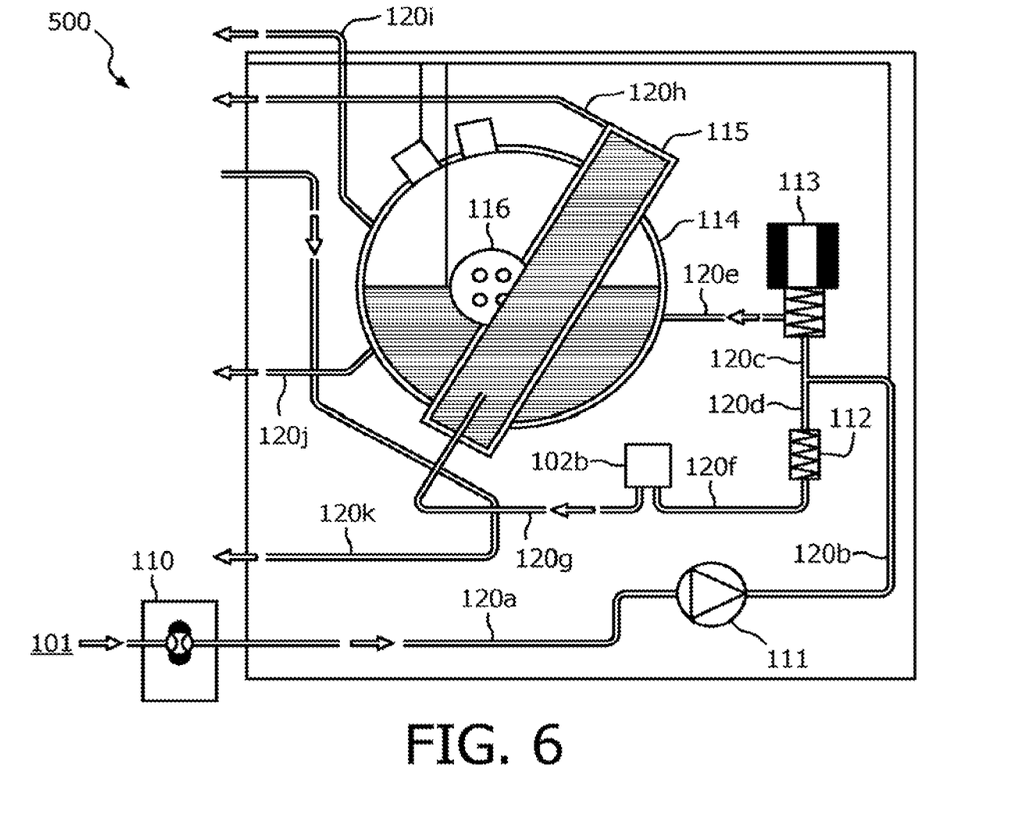
FIG. 6 illustrates a diagram of an exemplary schematic architecture of a coffee maker which comprises a pH adjustment unit according to an embodiment of the present disclosure.

As illustrated in FIG. 6, water 101 enters into a water tank 110, and the water will be pumped and fed through pipes 120a, 120b, 120c and 120d to a valve 112 and a solenoid valve 113 by a pump 111. When the valve 112 is opened, the water will flow, through a pipe 120f, into the pH adjustment unit 102b in which the water is treated. In the meantime, when the solenoid valve 113 is opened, the water will flow into a boiler 114 in which the water is heated. In the pH adjustment unit 102b, the pH value of the water will be adjusted to the target pH value and the water with the target pH value will in turn be fed to a heat exchanger 115. In the heat exchanger 115, heat exchange will take place between the water contained in the heat exchanger 115 and steam and water contained in the boiler 114. Or, in other words, the water contained in the heat exchanger 115 will be heated by steam and hot water contained in boiler 114. After that, the heated water contained in the heat exchanger 115 will be further fed to the brewing unit of the coffee maker, especially to the brewing head, through pipe 120h. Steam in the boiler 114 will be provided to the steam valve through pipe 120i, and the steam may be used to froth milk while hot water in the boiler 114 may flow into pipe 120j and finally flows back into a pressure reduction valve through pipe 120k.

It should be appreciated that the pH adjustment unit 102b could be also integrated into the water tank 110 to control the properties of the water in the tank. In this case, it would be required to adjust the water properties of all the water in the tank each time. In addition, it is also possible to arrange the pH adjustment unit at any other position between the heat exchanger 115 and the water tank 110, for example downstream of the pump 111. However, it may be appreciated that the preferred solution is to get the required amount of water from the tank and then adjust the properties of the water to the required pH value.

The pH adjustment unit 120b can use conventional water electrolysis technologies to adjust the pH of water. The electrolysis-based approach applies electric power to decompose water into $O_2$ and $H_2$ and at the same time leave $OH^-$ and $H^+$ in the water. The chemical change can be expressed by the following expressions (1) and (2):

$$2H^+ + 2e^- \rightarrow H_2 \text{ (Cathode)} \qquad (1)$$

$$4OH^- - 4e^- \rightarrow 2H_2O + O_2 \text{ (Anode)} \qquad (2)$$

Therefore, the pH value of water can be changed so as to obtain alkaline water or acidic water. However, the disadvantage of this technology is that unwanted waste water will be generated.

In preferred embodiments of the present disclosure, the uni-directional (Uni-D) pH adjustment technology may be used, which is based on a pseudo-faradic reaction. Hereinafter the pH adjustment unit based on the Uni-D pH adjustment technology will be described in detail with reference to FIGS. 7 to 9B.

Figure 7:
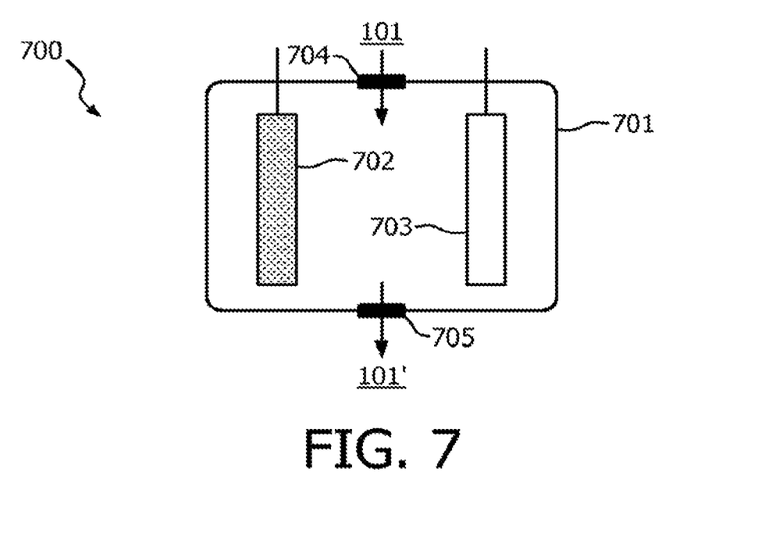
FIG. 7 illustrates a schematic diagram of an exemplary pH adjustment unit according to an embodiment of the present disclosure.

Next, reference is first made to FIG. 7, which is a schematic diagram of an exemplary pH adjustment unit according to an embodiment of the present disclosure. As illustrated in FIG. 7, the adjustment unit 120b may include water container 701, an electrode 702 and an electrode 703 as a counter electrode. The water container 701 is configured to receive water to be electrolyzed via a water inlet 704 and discharge treated water via a water outlet 705, or in other words water 101 will enter into the water container through the water inlet 704 and be electrolyzed, and then the treated water 101' will be discharged therefrom via the water outlet 705. However, it should be appreciated that both the water inlet 704 and the water outlet 705 are schematically shown only for the purpose of illustration, and the present disclosure is not limited to the specific locations and/or forms as illustrated in FIG. 7.

The two electrodes 702 and 703 are arranged face to face in the water container 701, and one of them acts as an anode and the other acts as a cathode. The two electrodes 702 and 703 are connected to a power supply (not illustrated) such as a DC power supply, which is controllable by the controller unit 102b and which is configured to provide the required pH adjustment control signal under control of the control unit to achieve a desired pH value. For example, the electrode 702 may be connected to a positive pole of the power supply and the electrode 703 to a negative pole of the power supply. The electrode 702 can be made from for example Ti, Pt, Au or any other inert metal or oxide thereof such as TiMMO (Titanium Mixed Metal Oxide). The electrode 22 can be made from, inter alia, active carbon.

Figure 8A:
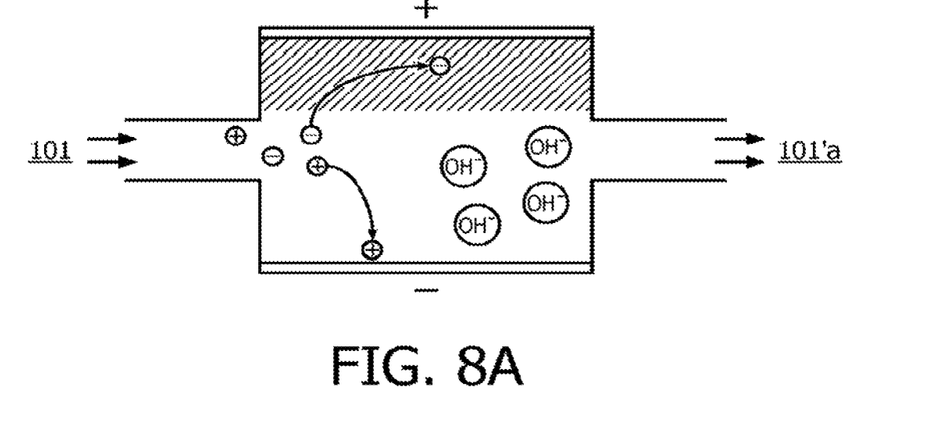
FIGS. 8A and 8B illustrate schematic diagrams of the operating principle for pH value adjustment according to an embodiment of the present disclosure.

FIGS. 8A and 8B illustrate schematic diagrams of the operating principle of a pH adjustment unit according to an embodiment of the present disclosure, wherein the electrode 702 is for example a TiMMO electrode and the electrode 703 is for example an active carbon electrode. First, in a case illustrated in FIG. 8A, the electrode 702 made from TiMMO acts as the anode and the electrode 703 made from active carbon material acts as a cathode. During the electrolysis process, a pseudo-faradic reaction takes place at the anode, whereby the oxidation status of the transition metal is increased. The anode loses electrons, and anions in the solution are absorbed by TiMMO, wherein the hatched area schematically shows an electrochemical ion absorption reaction. Or in other words, $H^+$ ions in the water 101 that is fed into the water container are consumed by collecting(?) the electrons at the cathode while $OH^-$ ions in the water are not consumed at the anode and are left in the water. This breaks the original balance between $H^+$ and $OH^-$, and thus the pH value of the solution is increased and alkaline water 101' a is obtained.

Figure 8B:
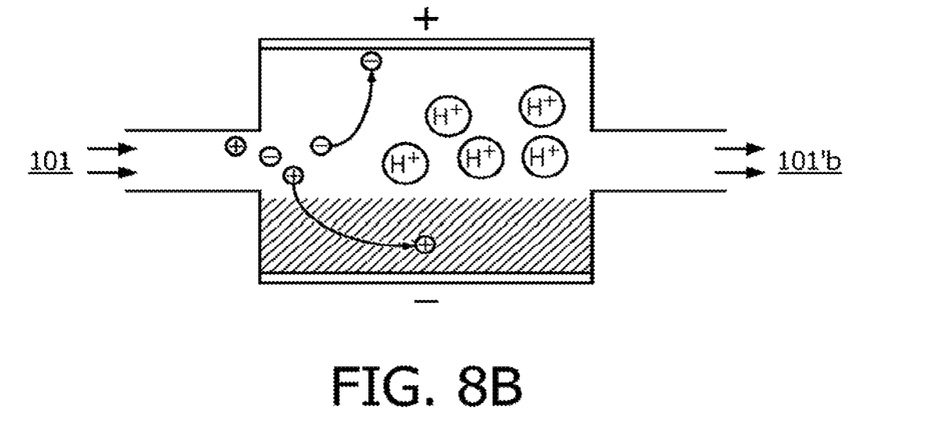

On the other hand, as illustrated in FIG. 8B, the electrode 702 made from TiMMO acts as the cathode and the electrode made from active carbon material acts as the anode. In the pH adjustment unit, a pseudo-faradic reaction at the cathode takes place, whereby the oxidation status of the transition metal is lowered, together with absorption of cations into the lattice of TiMMO, wherein the hatched area schematically shows an electrochemical ion absorption reaction. At or near the anode, $OH^-$ ions in water become oxidized by losing electrons (i.e., are oxidized), thereby producing $H_2O$ and $O_2$. That is to say, $OH^-$ ions in the water are consumed while $H^+$ ions remain in the water. Accordingly, the imbalance between $H^+$ and $OH^-$ causes the pH value of the solution to decrease and thus acid water 101'$b$ is obtained.

Figure 9A:
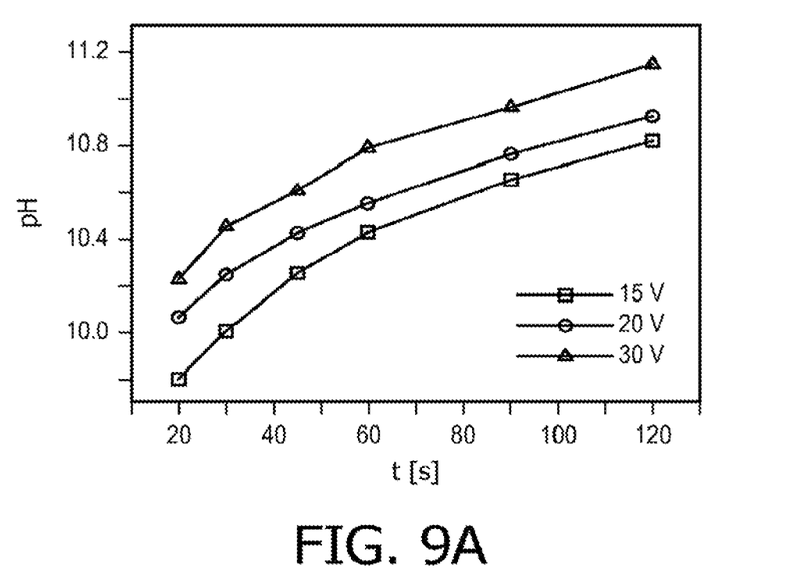
FIGS. 9A and 9B illustrate the carrying out of a pH value adjustment according to an embodiment of the present disclosure.
Figure 9B:
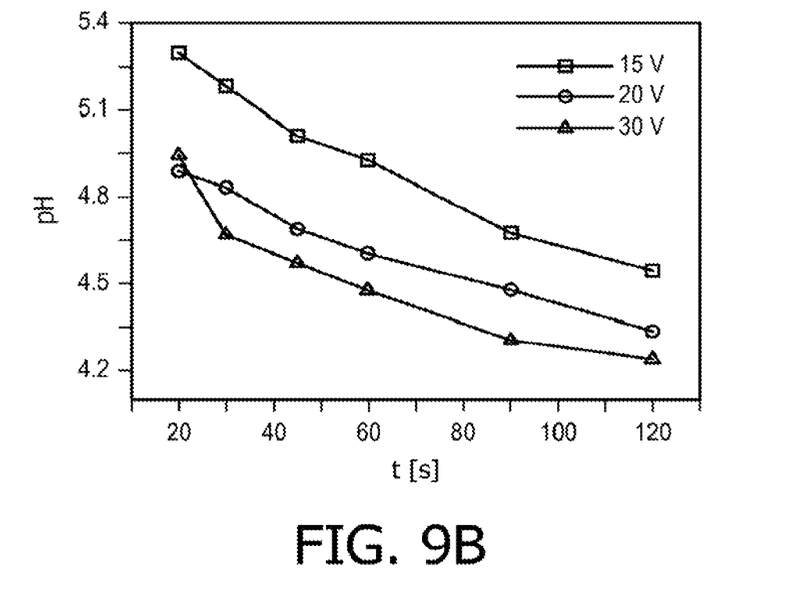

FIGS. 9A and 9B illustrate performance of a pH adjustment unit according to an embodiment of the present disclosure. From plots as given in these figures, it can be seen that the pH adjustment performance is dependent on electrolysis time and current/voltage. The longer the water is in contact with the electrodes, the more $OH^-$ anions or $H^+$ cations (depending on whether the TiMMO electrode acts as anode or cathode) are generated, which means a lower or higher pH could be achieved. On the other hand, increasing the current/voltage will increase the electron transfer speed between electrodes and the water, and thus the generation rate of $OH^-$ or $H^+$ ions in the water may be increased accordingly. Besides, although not illustrated, it may also be appreciated that the flow rate of water also has a substantial effect on the pH adjustment performance. Generally, the larger the flow rate, the shorter the time the water will be in contact with the electrode, and thus the smaller the numbers of $H^+$ or $OH^-$ ions produced, and vice versa.

Using the Uni-D pH adjustment unit according to embodiments of the present disclosure, pH adjustment may be efficiently achieved and at the same time said adjustment unit will not generate any undesirable waste water.

Figure 10:
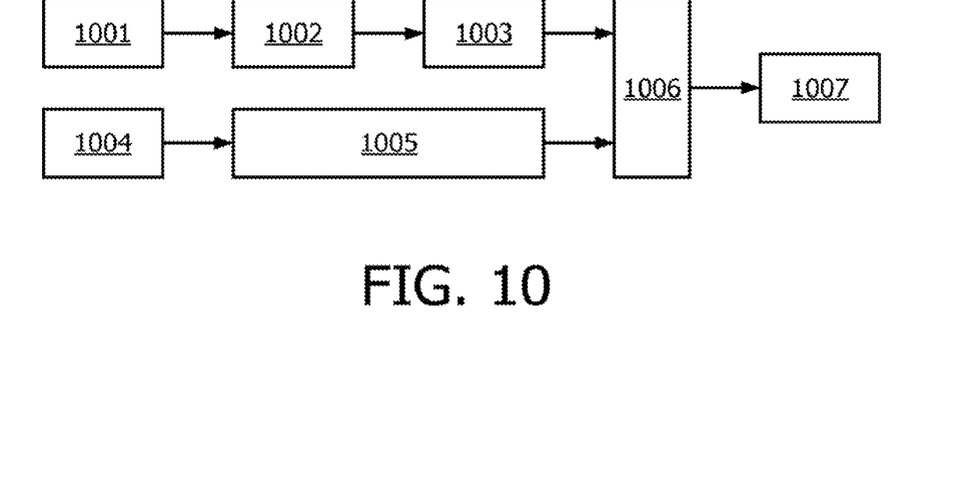
FIG. 10 illustrates a schematic diagram of ion exchange for coffee brewing according to another embodiment of the present disclosure.

Besides, in some embodiments of the present disclosure, to improve the taste of coffee, especially for espresso coffee, the apparatus 102 may further comprise an ion exchanger to increase the amount of crema. As is known, the crema is one of the most important components for espresso coffee and its volume and texture greatly influence a coffee drinker's first impression. The crema volume index is used to quantify the amount of crema which usually can be represented by the ratio of crema volume to total liquid volume. In addition to the crema, coffee acidity is another critical parameter to evaluate the taste of coffee. Generally, the resulting crema volume index of coffee made by an existing coffee maker is lower than 10%, which is much lower than the minimum value of the crema volume index for a perfect crema. Herein, there is further provided a solution by means of which the amount of crema may be increased through ion exchange FIG. 10 is a schematic diagram of ion exchange for coffee brewing according to another embodiment of the present disclosure. As illustrated in FIG. 10, water 1001 will be fed to the ion exchanger 1002 in which the water will be treated through anion ion exchange so that the treated water is abundant in bicarbonate ions which could be a main component of the crema. Then, the treated water is fed to a heating system 1003 to be heated and subsequently to the brewing unit 1006. Meanwhile, coffee beans 1004 will be fed to and ground in the grinding unit 1005, and after that the ground coffee beans will be fed to the brewing unit 1006. In the brewing unit 1006, the coffee will be brewed with treated water and the ground coffee beans. After the brewing operation, the coffee 1007 is ready. Due to abundant bicarbonate ions in the treated water, more crema will be generated in the coffee brewing process. Therefore, the resulting crema volume index may be improved greatly. In addition to the anion exchange relating to bicarbonate ions, the cation exchange may also be performed so as to exchange hardness cations (such as $Ca^{2+}$, $Mg^{2+}$, or the like) contained in water, which may result in scaling issues, for beneficial cations (such as $Na^+$, $K^+$ and so on), which are beneficial to the human body and which do not result in scaling issues. In such a way, the descaling problem may be alleviated at the same time as well.

Figure 11A:
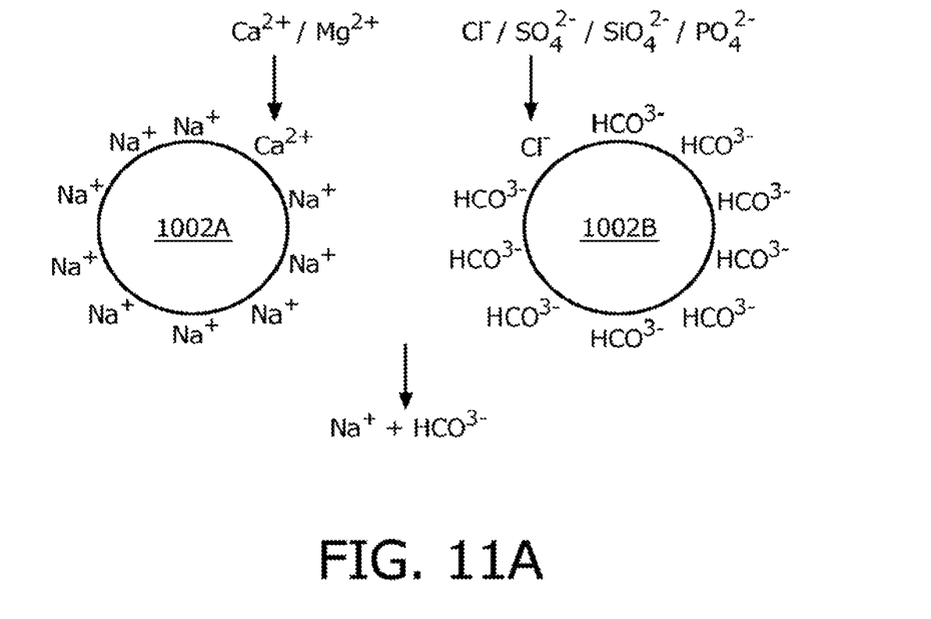
FIGS. 11A and 11B illustrate schematic diagrams of exemplary ion exchange resins that can be used in the present disclosure.
Figure 11B:
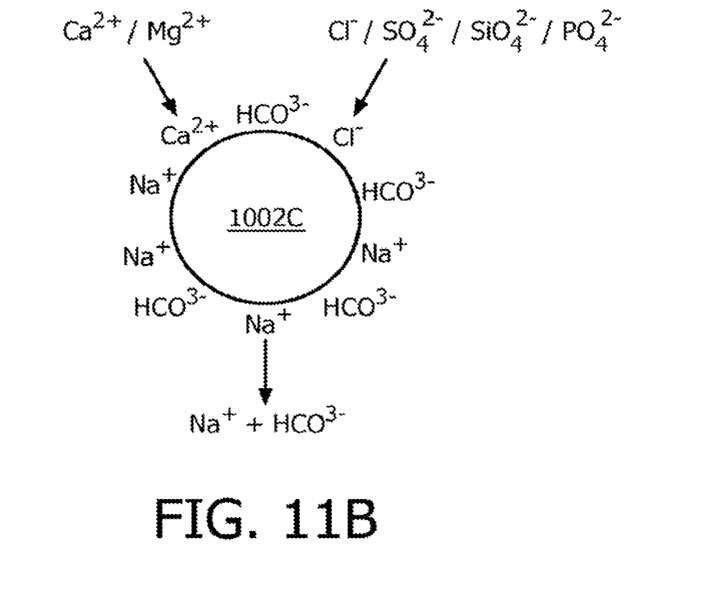

In embodiments of the present disclosure, ion exchange resins for anion-ion exchange and cation-ion exchange may be separate resins. For example, as illustrated in FIG. 11A, cation exchange resin 1002A with counter ions of $Na^+$ or $K^+$ may be used for removing hardness ions such as $Ca^{2+}$, $Mg^+$, or the like. Anion exchange resin 1002B with counter ions of $HCO_3^-$ is used for absorbing anions such as $Cl^-$, $SO_4^{2-}$, $SiO_4^{2-}$, $PO_4^{2-}$ and releasing bicarbonate ions into the water. Alternatively, as illustrated in FIG. 11B, the ion exchange resins could also be amphoteric ion exchange resins 1002C, which contain positive groups and negative groups on the polymer chain simultaneously, such as ion retardation resin DOW 11A8.

Figure 12:
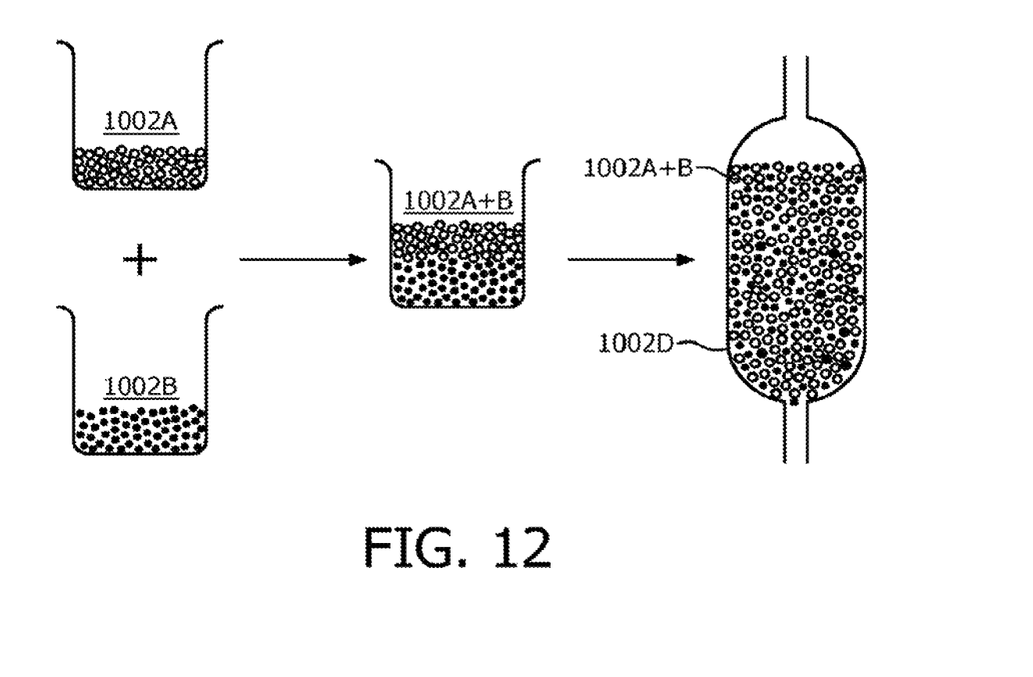
FIG. 12 illustrates a schematic diagram of an exemplary preparation of an ion exchanger according to an embodiment of the present disclosure.

FIG. 12 shows in a schematic diagram an exemplary preparation of an ion exchanger according to an embodiment of the present disclosure. Cation exchange resins with $Na^+$ counter ions as denoted by 1002A may be used, which are commercially available. The original anion exchange resins may be $Cl^-$-type. Before use, they may be immersed in saturated bicarbonate solution such as $NaHCO_3$ solution, $KHCO^3$ solution, etc, for hours, so as to exchange all $Cl^-$ ions in the resins for $HCO_3^-$. In such a way, anion exchange resins with $HCO_3^-$ ions can be obtained. After that, the two types of resins may be mixed in proportion and finally bi-ion resins are obtained (1002A+B). Finally, the mixed resins are piled in a container 1002D, which comprises a water inlet 1002E and a water outlet 1002F. The water to be fed to the brewing unit may be introduced into the container 1002D via the water inlet 1002E; in the container, the ion exchange will be performed and then the water will be discharged from the container 1002D through water outlet 1002F after being treated. Generally, the treatment of the fed-in water might take several minutes, which depends on the water flow rate. For example, a test shows that, if a flow rate of 100 ml/min is set, 500 ml of treated water will have been prepared after 5 minutes, which is available to brew at least 4 shots of espresso.

Besides, it may be understood that water, such as tap water, often contains hardness ions, calcium ions, magnesium ions, chlorine ions, sulphate ions, silicate ions, phosphate ions and so on, but after the treatment, all anions may be replaced by carbonate ions and at the same time, these hardness ions such as $Ca^{2+}$, $Mg^{2+}$ are replaced by monocovalent ions, such as $Na^+$. That is to say, more beneficial ions are present and the treated water is much more suitable for coffee brewing. Due to the decrease in hardness ions, such as $Ca^{2+}$ and $Mg^{2+}$, there is a lower risk that the heater is subject to scaling issues, and due to the fact that the $HCO_3^-$ content in treated water is higher, espresso coffee with a higher volume of crema may be produced during extraction of coffee flavor compounds from the coffee powders by using the heated water.

The inventors have done experiments on four exemplary types of water prepared for brewing espresso and the properties of each type of water are listed in Table 1. Table 1 Properties of water samples

TABLE 1

Properties of water samples

| Water | Temporary hardness(° dH) | Hardness (° dH) | EC (s/cm) | pH |
| --- | --- | --- | --- | --- |
| W1 | 6 | 13 | 491 | 8.07 |
| W1_treated | 14 | <1 | 445 | 7.4 |
| W2 | 10 | 20 | 614 | 7.53 |
| W2_treated | 17 | <1 | 601 | 7.47 |

In the Table, water W1_treated and W2_treated is water obtained by treating water W1 and W2 through cation and anion exchange as proposed in the present disclosure. Compared to water W1 and W2, the temporary hardness (indication of bicarbonate ions) of water W1_treated and W2_treated is increased substantially; the hardness of water W1_treated and W2_treated is decreased to less than 1; the electric conductivity of water W1_treated and W2_treated is decreased slightly due to the weaker electric conductivity of bicarbonate ions; the pH of water W1_treated and W2_treated is slightly decreased because of the absence of phosphate ions, silicate ions that lead to higher pH values.

Figure 13:
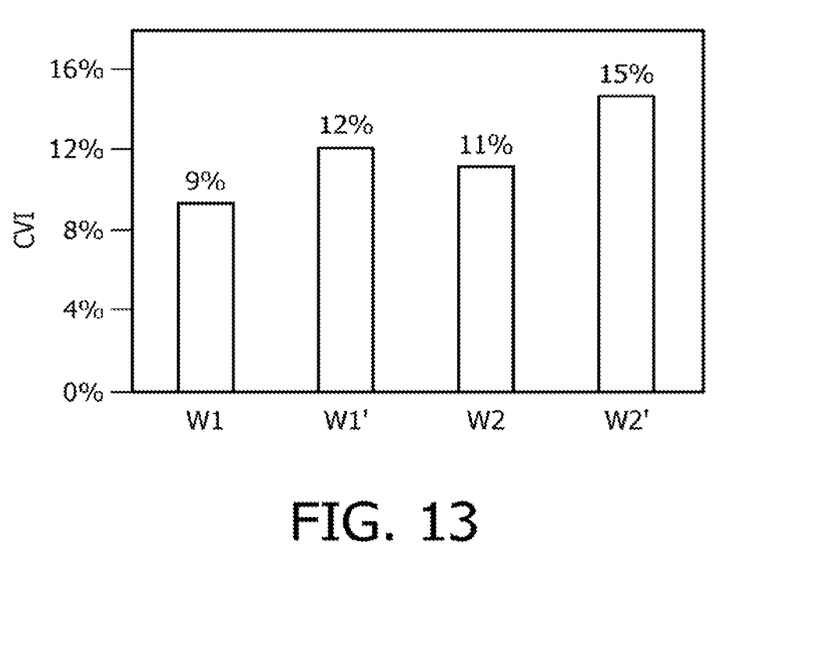
FIG. 13 illustrates the influence of water on the crema volume index (CVI) according to an embodiment of the present disclosure.
Figure 14:
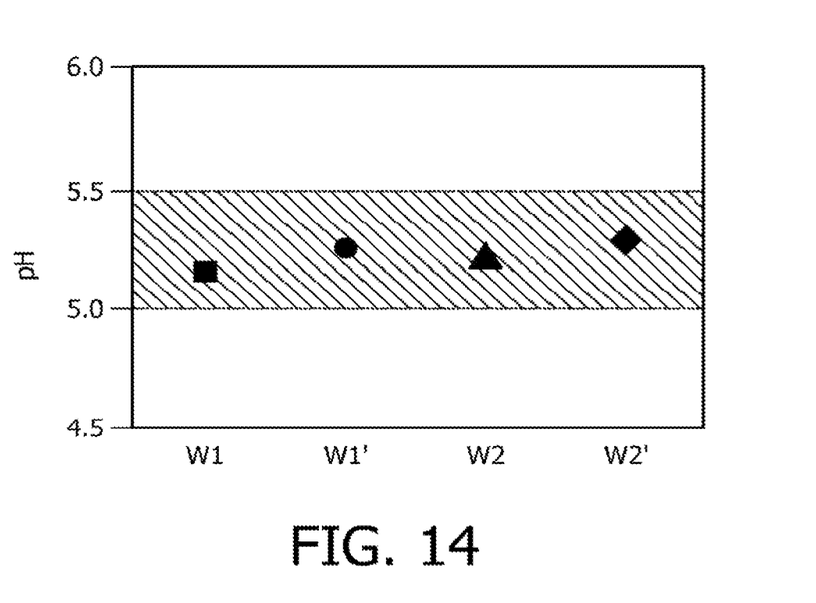
FIG. 14 illustrates the influence of water on the pH value of brewed coffee according to an embodiment of the present disclosure.

The water samples were each used to brew espresso coffee. Here, Illy coffee beans (medium roasted) were used. After brewing, the crema volume was recorded, the pH of the brew was tested. FIG. 13 and FIG. 14 respectively illustrate the recorded crema volume index (CVI) and the pH test value. From FIG. 13, it is clear that water with a larger amount of bicarbonate ions produces more crema. Specifically, the crema volume index of W1 increased to about 12% after the treatment, and the crema of W2 increased to about 15% after the treatment. From FIG. 14, wherein the hatched area denotes the optimal pH range of the coffee brew, it may be seen that the brew pH values for all four types of water are within this optimal range, and the treatment by ion exchange nearly had no influence on the taste of coffee, such as coffee acidity.

Hereinafter, descriptions are given mainly of embodiments of apparatus as provided in the present disclosure, and next reference is made to FIG. 15 to describe the method of controlling the taste of coffee according to an embodiment of the present disclosure.

Figure 15:
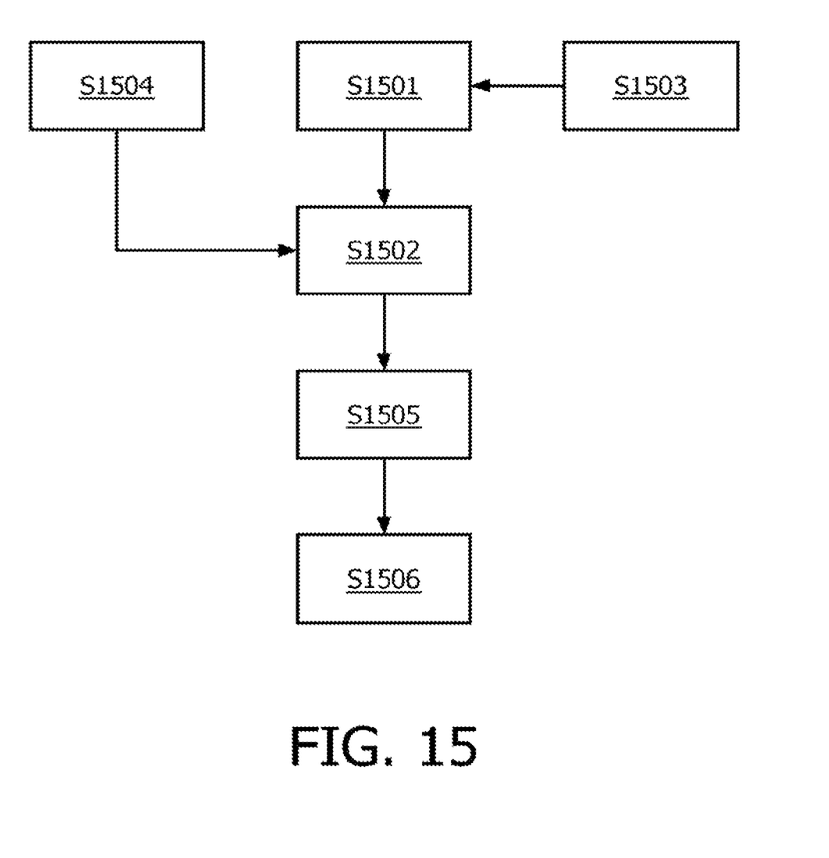
FIG. 15 illustrates a flowchart of an exemplary method of controlling coffee taste according to an embodiment of the present disclosure.

As illustrated in FIG. 15, at step S1501, there may be determined a target pH value of water corresponding to a desired coffee taste and a corresponding adjustment control signal. In an embodiment of the present disclosure, the target pH value of water may be determined based on a professional taste evaluation (A1), particularly the relationship between pH values and coffee tastes provided through the professional taste evaluation. For example, the taste of the coffee to be made will be recommended by experts and thus the target pH value will be determined as the pH value which is considered to be optimal for the coffee taste by the experts, so that it is possible to ensure a consistent taste for a certain kind of coffee. Additionally, or alternatively, the target pH value of water may also be determined based on customer personal preference (A2), especially regarding coffee taste properties or water properties. The customer may select his own preference through the user interface provided on the coffee maker. The customer's selection may be mapped to a target value or may be linked to the professional taste evaluation, which will in turn map to a corresponding pH value. Therefore, it is possible to implement a personalized taste control. Moreover, the coffee maker(?) may further sense properties of coffee beans or grinds at step S1503. In such a case, additionally or alternatively, the target pH value of water may be further determined based on the sensed properties of coffee beans or grinds. Thus, by determining the target pH value, the different properties of coffee beans or grinds may be considered, thus providing a further possibility to make a desired cup of coffee. Based on the determined target value, a corresponding adjustment control signal may be determined, which may be a polarity and amplitude of the current/voltage and/or the flow rate of water.

Then, at step S1502, in response to the adjustment control signal, a pH value of water to be fed into a brewing unit of a coffee maker may be adjusted to the target pH value. The pH adjustment may be performed based on conventional electrolysis technology. Or, alternatively, the pH adjustment may be performed based on Uni-D pH adjustment technology, which will not generate any undesired waste water.

Besides, a descaling pH target value of water may be further determined based on at least one of the hardness setting of the water and the treatment efficiency so as to descale the coffee maker in a rinsing cycle or in a continuous way at step S1504. In such a way, the scaling problems may also be addressed.

In addition, to produce more crema, at step S1505, anions present in the water to be fed to the brewing unit of the coffee maker may be exchanged for bicarbonate ions by ion exchange resins. Particularly, the ion exchange resins are prepared by immersing anion exchange resins in saturated bicarbonate solution. At the same time, cations contained in the water may also be exchanged for beneficial cations by the ion exchange resins or additional ion exchange resins at step S1506. In such a way, more crema may be produced in the coffee making process and in the meantime the scaling problem may be addressed as well.

Hereinbefore, the method as proposed in the present disclosure has been briefly described, however it may be appreciated that detailed operations in the method correspond to operations of apparatus as provided with reference to FIGS. 1 to 14, and thus for details regarding the method as proposed herein, reference may be made to the description with reference to FIGS. 1 to 14.

Besides, it may be understood that the ion exchanger 1002 may be combined with the coffee control apparatus 102, for example located downstream or upstream of the pH adjustment unit 102*b* of the apparatus, but this is not to be construed in a limiting sense and it is also possible to perform the ion exchange individually as a separate solution. Additionally, although the crema has been described as one of the most important evaluation indicators for espresso coffee, the ion exchange as proposed in the present disclosure is not limited only to espresso coffee but may also be performed whenever the customer wants more crema. For example, the user interface could provide an option for more crema; if the customer selects more crema, the ion exchange may be performed; otherwise, the ion exchange may not be performed. This could be implemented by providing a bypass pipe without an ion exchanger and two valves for controlling the water so as to flow through either the bypass pipe or the pipe with the ion exchanger.

In addition, it may be appreciated that factors as given in FIG. 3 may be used separately or in combination with each other in any proper form. Moreover, it is possible to add other factors which are different from those given in FIG. 3, or it is also possible to use fewer factors in determining the target pH value, depending on the requirements of the applications.

Therefore, it is to be understood that the embodiments of the disclosure are given only for the purpose of illustration and the present disclosure is not to be limited to the specific embodiments disclosed herein. Modifications and other possible embodiments are intended to be included within the scope of the appended claims.

The invention claimed is:

1. A method of controlling a taste of coffee, the method comprising:
   determining, by a control unit of a coffee maker, a target pH value of water corresponding to a desired coffee taste and an adjustment control signal corresponding to the target pH value; and
   adjusting, by an electrolysis pH adjustment unit of the coffee maker, in response to the adjustment control signal, a pH value of the water to the target pH value of the water, to be fed into a brewing unit of the coffee maker, by adjusting one or more of a voltage or a current of the electrolysis pH adjustment unit or a flow velocity of the water in the electrolysis pH adjustment unit.

2. The method according to claim 1, wherein the target pH value of the water is determined based on a relationship between pH values and corresponding coffee taste properties.

3. The method according to claim 1, wherein the target pH value of the water is determined based on a customer personal preference setting regarding coffee taste properties or water properties.

4. The method according to claim 1, further comprising:
   sensing properties of coffee beans or grinds,
   wherein the target pH value of the water is further determined based on the sensed properties of the coffee beans or grinds.

5. The method according to claim 1, further comprising:
   determining a descaling target pH value of the water, based on at least one of a hardness setting of the water and a time it takes the electrolysis pH adjustment unit to adjust the pH value of the water, to descale the coffee maker.

6. The method according to claim 1, further comprising:
   exchanging anions contained in the water, to be fed to the brewing unit of the coffee maker, for bicarbonate ions by ion exchange resins, wherein the ion exchange resins are prepared by immersing anion exchange resins in saturated bicarbonate solution.

7. The method according to claim 6, further comprising:
   exchanging hardness cations contained in the water for beneficial cations by the ion exchange resins or additional ion exchange resins.

8. The method according to claim 1, wherein the determining the adjustment control signal comprises determining the adjustment control signal based on the target pH value and an initial pH value of the water.

9. A coffee maker including an apparatus for controlling a taste of coffee, the apparatus comprising:
   a control unit configured to determine a target pH value of water corresponding to a desired coffee taste and an adjustment control signal corresponding to the target pH value; and
   an electrolysis pH adjustment unit configured to adjust, in response to the adjustment control signal applied to the electrolysis pH adjustment unit, a pH value of the water to the target pH value of the water, to be fed into a brewing unit of the coffee maker, by adjusting one or more of a voltage or a current of the electrolysis pH adjustment unit or a flow velocity of the water in the electrolysis pH adjustment unit.

10. The coffee maker according to claim 9, wherein the target pH value of the water is determined based on a relationship between pH values and corresponding coffee taste properties.

11. The coffee maker according to claim 9, wherein the target pH value of the water is determined based on a customer personal preference setting regarding coffee taste properties or water properties.

12. The coffee maker according to claim 9, wherein the apparatus further comprises a sensor configured to sense properties of coffee beans or grinds and configured to produce a corresponding sensor signal, and wherein the control unit is further configured to determine the target pH value of the water based on the corresponding sensor signal.

13. The coffee maker according to claim 9, wherein the control unit is further configured to determine a descaling target pH value of the water, based on at least one of a hardness setting of the water and a time it takes the electrolysis pH adjustment unit to adjust the pH value of the water, to descale the coffee maker.

14. The coffee maker according to claim 9, wherein the apparatus further comprises an ion exchanger including a container and ion exchange resins present in the container, wherein the ion exchange resins are configured to exchange anions contained in the water, to be fed to the brewing unit of the coffee maker, for bicarbonate ions, and wherein the ion exchange resins are prepared by immersing anion exchange resins in saturated bicarbonate solution.

15. The coffee maker according to claim 14, wherein the ion exchange resins are further configured to exchange hardness cations contained in the water for beneficial cations by the ion exchange resins or additional ion exchange resins.

16. The coffee maker according to claim 9, wherein the control unit is configured to determine the adjustment control signal based on the target pH value and an initial pH value of the water.

17. The coffee maker according to claim 16, wherein the initial pH value of the water is determined by a sensor that detects input water.

18. The coffee maker according to claim 9, wherein the coffee maker is further configured to store a relationship between pH values and coffee tastes.

19. A method of controlling a taste of coffee, the method comprising:
- determining, by a control unit of a coffee maker, a target pH value of water corresponding to a desired coffee taste and an adjustment control signal corresponding to the target pH value, wherein the target pH value is determined based on a relationship between pH values and coffee tastes; and
- adjusting, by an electrolysis pH adjustment unit of the coffee maker, in response to the adjustment control signal, a pH value of the water to the target pH value of the water, to be fed into a brewing unit of the coffee maker, by adjusting one or more of a voltage or a current of the electrolysis pH adjustment unit or a flow velocity of the water in the electrolysis pH adjustment unit.

20. The method according to claim 19, further comprising:
- determining a descaling target pH value of water, based on at least one of a hardness setting of the water and a time it takes the electrolysis pH adjustment unit to adjust the pH value of the water, to descale the coffee maker.

\* \* \* \* \*